(12) United States Patent
Yang et al.

(10) Patent No.: US 9,084,320 B2
(45) Date of Patent: Jul. 14, 2015

(54) LED LUMINAIRE HAVING HIGH POWER LED DRIVE CIRCUIT

(71) Applicant: POSCO LED COMPANY LTD., Seongnam-si (KR)

(72) Inventors: Hwi Seok Yang, Seongnam-si (KR); Chul Ju Kim, Seongnam-si (KR)

(73) Assignee: Posco LED Company Ltd., Seongnam-si (KR)

( * ) Notice: Subject to any disclaimer, the term of this patent is extended or adjusted under 35 U.S.C. 154(b) by 0 days.

(21) Appl. No.: 13/933,452

(22) Filed: Jul. 2, 2013

(65) Prior Publication Data

US 2014/0354156 A1 Dec. 4, 2014

(30) Foreign Application Priority Data

Jun. 3, 2013 (KR) ........................ 10-2013-0063228

(51) Int. Cl.
*H05B 37/02* (2006.01)
*H05B 33/08* (2006.01)

(52) U.S. Cl.
CPC .......... *H05B 33/0815* (2013.01); *H05B 33/083* (2013.01); *Y02B 20/46* (2013.01)

(58) Field of Classification Search
USPC .......... 315/185 R, 209 R, 210, 224, 226, 291, 315/294, 299, 302, 307
See application file for complete search history.

(56) References Cited

U.S. PATENT DOCUMENTS 8,164,276 B2 * 4/2012 Kuwabara ..................... 315/294
8,760,064 B1 * 6/2014 Yoon et al. .................... 315/192
8,907,590 B1 * 12/2014 LoCascio ...................... 315/307

2010/0308751 A1 * 12/2010 Nerone ......................... 315/312
2012/0262075 A1 * 10/2012 Lynch et al. .................. 315/192
2013/0113381 A1 * 5/2013 Cai et al. ....................... 315/122
2013/0300310 A1 * 11/2013 Hu ................................ 315/239
2014/0062317 A1 3/2014 Lee

FOREIGN PATENT DOCUMENTS

JP 2011-198739 10/2011
JP 2012-016136 1/2012
JP 2012-243458 12/2012
JP 2013-105713 5/2013

(Continued)

OTHER PUBLICATIONS

International Search Report issued on Feb. 20, 2014 in International Application No. PCT/KR2013/010388.

*Primary Examiner* — Tung X Le
(74) *Attorney, Agent, or Firm* — H.C. Park & Associates, PLC (57) ABSTRACT

An LED luminaire according to an exemplary embodiment of the present invention includes a rectifier outputting a first rectified voltage generated by rectifying AC voltage and flattening the rectified voltage, a power factor correction unit receiving the first rectified voltage output from the rectifier and generating and outputting a drive voltage, an LED light emitting unit including first to m-th light emitting groups each including at least one LED, the LED light emitting unit sequentially driven by receiving the drive voltage input from the power factor correction unit, and an LED drive IC determining a voltage level of the drive voltage upon receiving the drive voltage input from the power factor correction unit, and controlling sequential driving of the first to m-th light emitting groups according to the determined voltage level of the drive voltage.

10 Claims, 6 Drawing Sheets

(56) References Cited

FOREIGN PATENT DOCUMENTS

| KR | 10-2011-0095639 | 8/2011 |
| KR | 10-2012-0100569 | 9/2012 |
| KR | 10-2012-0110996 | 10/2012 |
| KR | 10-2012-0125142 | 11/2012 |

* cited by examiner

Fig. 1

(Related Art)

Fig. 2

(Related Art)

Boost PFC

Fig. 4B

Buck PFC

Fig. 4C

Buck-Boost PFC

Fig. 7

LED LUMINAIRE HAVING HIGH POWER LED DRIVE CIRCUIT

CROSS REFERENCE TO RELATED APPLICATION

This application claims priority from and the benefit of Korean Patent Application No. 10-2013-0063228, filed on Jun. 3, 2013, which is hereby incorporated by reference for all purposes as if fully set forth herein.

BACKGROUND

1. Field

The present invention relates to a light emitting diode luminaire, which includes a high power light emitting diode (LED) drive circuit, and more particularly, to an LED luminaire, which includes a plurality of light emitting groups each including a plurality of LEDs and a power factor correction unit capable of supplying stabilized drive voltage to an LED drive IC controlling the plurality of light emitting groups to be sequentially driven according to a voltage level of the drive voltage.

2. Discussion

A light emitting diode (LED) is a semiconductor device formed of gallium (Ga), phosphorus (P), arsenic (As), indium (In), nitrogen (N), aluminum (Al), and the like, and exhibiting diode characteristics, and emits blue, red, or green light upon application of electric current thereto. LEDs have been widely used in the art due to various merits such as a longer lifespan, a faster response (a period of time from a time point of receiving electric current to a time point of emitting light), and lower power consumption than electric bulbs.

Generally, a light emitting diode can be driven by direct current due to diode characteristics thereof. Accordingly, a typical LED luminaire has limited application and requires a separate circuit such as a switched-mode power supply (SMPS) in order to be driven by a domestic AC power source. As a result, the typical LED luminaire has a complicated drive circuit, causing increase in manufacturing costs.

To solve such problems, studies have been focused on development of a light emitting device capable of being driven by AC power by connecting a plurality of light emitting cells to each other in series or in parallel.

Figure 1:
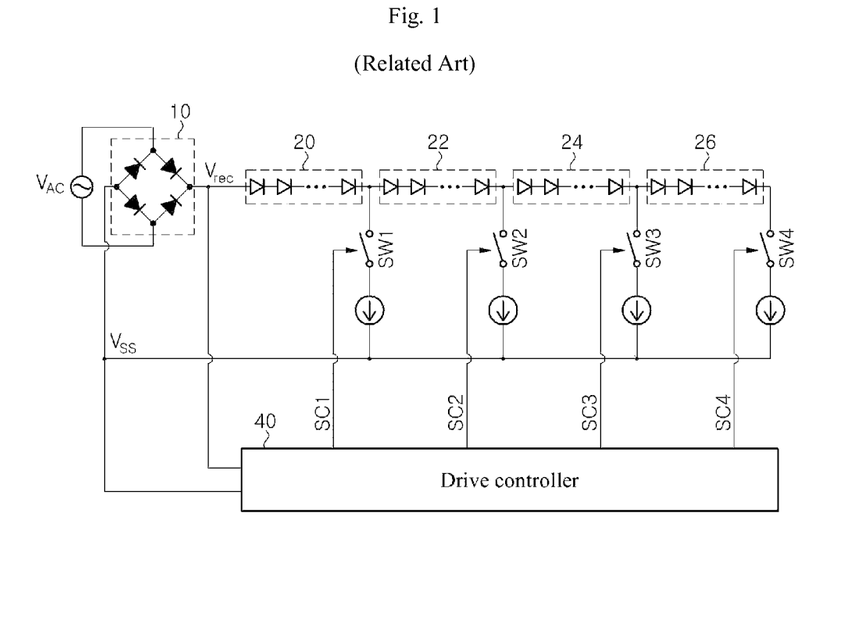
FIG. 1 is a block diagram of an AC LED luminaire in the related art.
Figure 2:
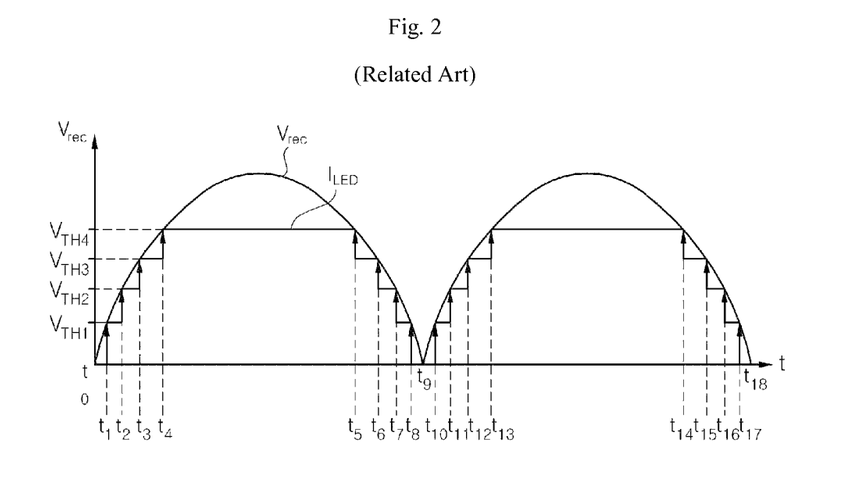
FIG. 2 is a waveform diagram of rectified voltage and LED drive current of the AC LED luminaire shown in FIG. 1.

FIG. 1 is a block diagram of an AC LED luminaire in the related art, and FIG. 2 is a waveform diagram of rectified voltage and LED drive current of the AC LED luminaire shown in FIG. 1.

As shown in FIG. 1, an AC LED luminaire in the related art includes a rectifier 10 which outputs rectified voltage Vrec through full-wave rectification of AC voltage supplied from an AC voltage source ($V_{AC}$), first to fourth light emitting groups 20, 22, 24, 26, which are sequentially driven by the rectified voltage Vrec, a drive controller 40 which controls sequential driving of the first to fourth light emitting groups 20, 22, 24, 26 according to a voltage level of the rectified voltage Vrec, and first to fourth light emitting group drive units SW1, SW2, SW3, SW4 each having a switching function and a constant current control function.

Referring to FIG. 2, in operation of the AC LED luminaire, the drive controller 40 determines the voltage level of the rectified voltage Vrec applied from the rectifier 10, and sequentially drives the first to fourth light emitting groups 20, 22, 24, 26 according to a voltage level of the rectified voltage Vrec.

Accordingly, in time zones in which the voltage level of the rectified voltage Vrec is greater than or equal to a first threshold voltage $V_{TH1}$ and less than a second threshold voltage $V_{TH2}$ (in t1~t2 and t7~t8 in a cycle of the rectified voltage), the drive controller 40 controls only the first light emitting group 20 to be driven by maintaining a first switch SW1 in a turn on state while maintaining a second switch SW2, a third switch SW3 and a fourth switch SW4 in a turn off state.

In addition, in time zones in which the voltage level of the rectified voltage Vrec is greater than or equal to the second threshold voltage $V_{TH2}$ and less than a third threshold voltage $V_{TH3}$ (t2~t3 and t6~t7 in a cycle of the rectified voltage), the drive controller 40 controls only the first light emitting group 20 and the second light emitting group 22 to be driven by maintaining the second switch SW2 in a turn on state while maintaining the first switch SW1, the third switch SW3 and the fourth switch SW4 in a turn off state.

Further, in time zones in which the voltage level of the rectified voltage Vrec is greater than or equal to the third threshold voltage VTH3 and less than a fourth threshold voltageVTH4 (t3~t4 and t5~t6 in a cycle of the rectified voltage), the drive controller 40 controls the first light emitting group 20, the second light emitting group 22 and the third light emitting group 24 to be operated by maintaining the third switch SW3 in a turn on state while maintaining the first switch SW1, the second switch SW2 and the fourth switch SW4 in a turn off state.

Further, in time zones in which the voltage level of the rectified voltage Vrec is greater than or equal to the fourth threshold voltage $V_{TH4}$ (t4~t5 in a cycle of the rectified voltage), the drive controller 40 controls the AC LED luminaire to allow all of the first to fourth light emitting groups 20, 22, 24, 26 to be driven by maintaining the fourth switch SW4 in a turn on state while maintaining the first to third switches SW1, SW2, SW3 in a turn off state.

On the other hand, in the AC LED luminaire as shown in FIG. 1, the LED drive IC has a low voltage switching withstand voltage of 500V or less and thus is vulnerable to surge voltage. In order to prevent circuit damage by surge voltage and/or inrush current, a surge protection circuit (SPC) comprised of circuit protection devices may be added to a front side of the LED drive IC, but does not provide enough surge protection effects due to too low a withstand voltage of the LED drive IC. Further, in order to solve such problems, an automatic voltage regulator (AVR), a surge protection device (SPD), and the like are separately used in the art. However, the use of the surge protection device and the like results in increase in size and manufacturing costs of the LED luminaire, so that the fundamental purpose of using the LED drive IC cannot be satisfied.

Further, in the AC LED luminaire as shown in FIG. 1, the drive controller 40, the first light emitting group drive unit SW1, the second light emitting group drive unit SW2, the third light emitting group drive unit SW3, the fourth light emitting group drive unit SW4, and the like are incorporated into a single LED drive integrated circuit (IC), which is generally used to implement the AC LED luminaire. In the LED luminaire using such an LED drive IC, output current of the LED drive IC is maintained at a constant current even upon variation of input voltage thereof, whereas output voltage of the LED drive IC varies upon variation of input voltage thereof, so that overall power consumption of the LED luminaire can be rapidly increased or decreased by variation of the input voltage. As a result, since the LED luminaire using the LED drive IC does not employ energy storage devices such as an inductor, a capacitor, and the like, LEDs act as resistors, and receives output power varying according to variation of the input voltage, causing heat generation from the LEDs and reduction in lifespan of the LEDs.

Therefore, in configuration of a high power LED luminaire using an LED drive IC, there is a need for a means for protecting the LED drive IC from surge voltage and voltage variation while ensuring fundamental purposes of the LED luminaire.

SUMMARY

The present invention has been conceived to solve such problems in the art.

It is one object of the present invention to provide an LED luminaire that includes a high power LED drive circuit and is capable of protecting the LED drive IC from surge voltage.

It is another object of the present invention to provide an LED luminaire that includes a high power LED drive circuit and is capable of protecting the LED drive IC from voltage variation.

In order to achieve the aforementioned objects and advantages of the present invention, the present invention has the following features.

In accordance with one aspect of the present invention, an LED luminaire includes: a rectifier outputting a first rectified voltage generated by rectifying AC voltage and flattening the rectified voltage; a power factor correction unit receiving the first rectified voltage output from the rectifier, and generating and outputting a pulsating drive voltage, which is equal to or greater than the first threshold voltage, by stepping up or stepping down the first rectified voltage drive voltage; an LED light emitting unit including first to m-th light emitting groups (m being a positive integer of 2 or more) each including at least one LED, and sequentially driven by receiving the drive voltage input from the power factor correction unit; and an LED drive IC determining a voltage level of the drive voltage upon receiving the drive voltage input from the power factor correction unit, and controlling sequential driving of the first to m-th light emitting groups according to the determined voltage level of the drive voltage.

The power factor correction unit generates the drive voltage by stepping up and stabilizing the AC voltage.

The power factor correction unit includes a boost converter or a buck-boost converter.

The power factor correction unit generates the drive voltage by stepping down and stabilizing the AC voltage.

The power factor correction unit includes a buck converter or a buck-boost converter.

The power factor correction unit includes a DC voltage supply circuit receiving the first rectified voltage, stabilizing the received first rectified voltage to generate DC power for driving a control IC, and supplying the DC power to the control IC; a boost converter circuit receiving the first rectified voltage and stepping up the received first rectified voltage in response to a switching control signal from the control IC to generate and output the drive voltage; and the control IC generating and outputting the switching control signal to the boost converter circuit.

The boost converter circuit further includes a first inductor connected to the rectifier and receiving the first rectified voltage input from the rectifier to accumulate energy while the first switching device is turned on and to generate counter electromotive force while the first switching device is turned off, and a first switching device connected in parallel to the first inductor to be turned on/off in response to a switching control signal from the control IC; the power factor correction unit further includes a zero point detection circuit detecting the energy stored in the first inductor, and an output voltage detection circuit connected to an output terminal of the boost converter circuit and detecting the drive voltage output from the boost converter circuit; and the control IC is connected to the zero point detection circuit and the current detection circuit, and generating the switching control signal to turn on the first switching device when the energy stored in the first inductor reaches 0 (zero) and to turn off the first switching device when the drive voltage becomes a preset critical value or less.

The boost converter circuit further includes a first capacitor connected in parallel between the first switching device and the output terminal of the boost converter circuit and flattening the drive voltage, and a first diode connected between the first capacitor and the first inductor and blocking reverse current flowing from the first capacitor to the first inductor.

The power factor correction unit further includes a current detection circuit connected between the first switching device and ground, and detecting electric current flowing through the first switching device, and the control IC stops switching of the first switching device when the electric current input from the current detection circuit is greater than a preset overcurrent reference value.

The control IC stops switching of the first switching device when the drive voltage input from the output voltage detection circuit is greater than a preset overvoltage reference value.

The LED luminaire includes n LED light emitting units and n LED drive ICs (n being a positive integer of 2 or more), and each of the LED drive ICs controls sequential driving of an associated LED light emitting unit.

As described above, according to the present invention, the LED luminaire may protect an LED drive IC from surge voltage and may be manufactured in a small size at reduced costs.

In addition, according to the present invention, the LED luminaire may prevent heat generation from LEDs and reduction in lifespan of the LED by supplying stabilized drive voltage to a sequential drive type LED drive IC.

Further, the present invention enables manufacture of a high power LED luminaire by application of a drive IC while securing high reliability.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The present invention will be described more fully hereinafter with reference to the accompanying drawings, in which exemplary embodiments of the invention are illustrated. These embodiments will be described such that the invention can be easily realized by a person having ordinary knowledge in the art. Here, although various embodiments are disclosed herein, it should be understood that these embodiments are not intended to be exclusive. For example, individual structures, elements or features of a particular embodiment are not limited to that particular embodiment and can be applied to other embodiments without departing from the spirit and scope of the invention. In addition, it should be understood that locations or arrangement of individual components in each of the embodiments may be changed without departing from the spirit and scope of the present invention. Therefore, the following embodiments are not to be construed as limiting the invention, and the present invention should be limited only by the claims and equivalents thereof. Like components will be denoted by like reference numerals, and lengths, areas, thicknesses and shapes of the components are not drawn to scale throughout the accompanying drawings.

Now, exemplary embodiments of the present invention will be described in detail with reference to the accompanying drawings such that the invention can be easily realized by a person having ordinary knowledge in the art.

Exemplary Embodiments of the Invention

As used herein, the term "light emitting group" means a group of LEDs (LED packages) that are connected to each other via series/parallel/series-parallel connection in the form of chips or packages on an insulating or non-insulating substrate and are simultaneously operated (that is, simultaneously turned on/off) as a single component by a controller.

In addition, the term "threshold voltage $V_{TH}$" means a voltage level at which a light emitting group can be driven. Here, the term "first threshold voltage $V_{TH1}$" means a voltage level at which a first light emitting group can be driven, and the term "second threshold voltage $V_{TH2}$" means a voltage level at which the first and second light emitting groups can be driven. When the threshold voltage of the first light emitting group is the same as that of the second light emitting group, the second threshold voltage $V_{TH2}$ is $2V_{TH1}$. Thus, as used herein, the term "n-th threshold voltage $V_{THn}$" means a voltage level at which all of the first to n-th light emitting groups can be driven.

Further, the term "sequential drive type" means a driving method, in which LEDs provided to each light emitting group are sequentially turned on as AC voltage increases, when a voltage level of a rectified voltage generated by full-wave rectification of the AC voltage is greater than a threshold voltage capable of operating the LEDs, and the LEDs are sequentially turned off as the AC voltage decreases, when the voltage level of the rectified voltage is less than or equal to the threshold voltage.

Figure 3:
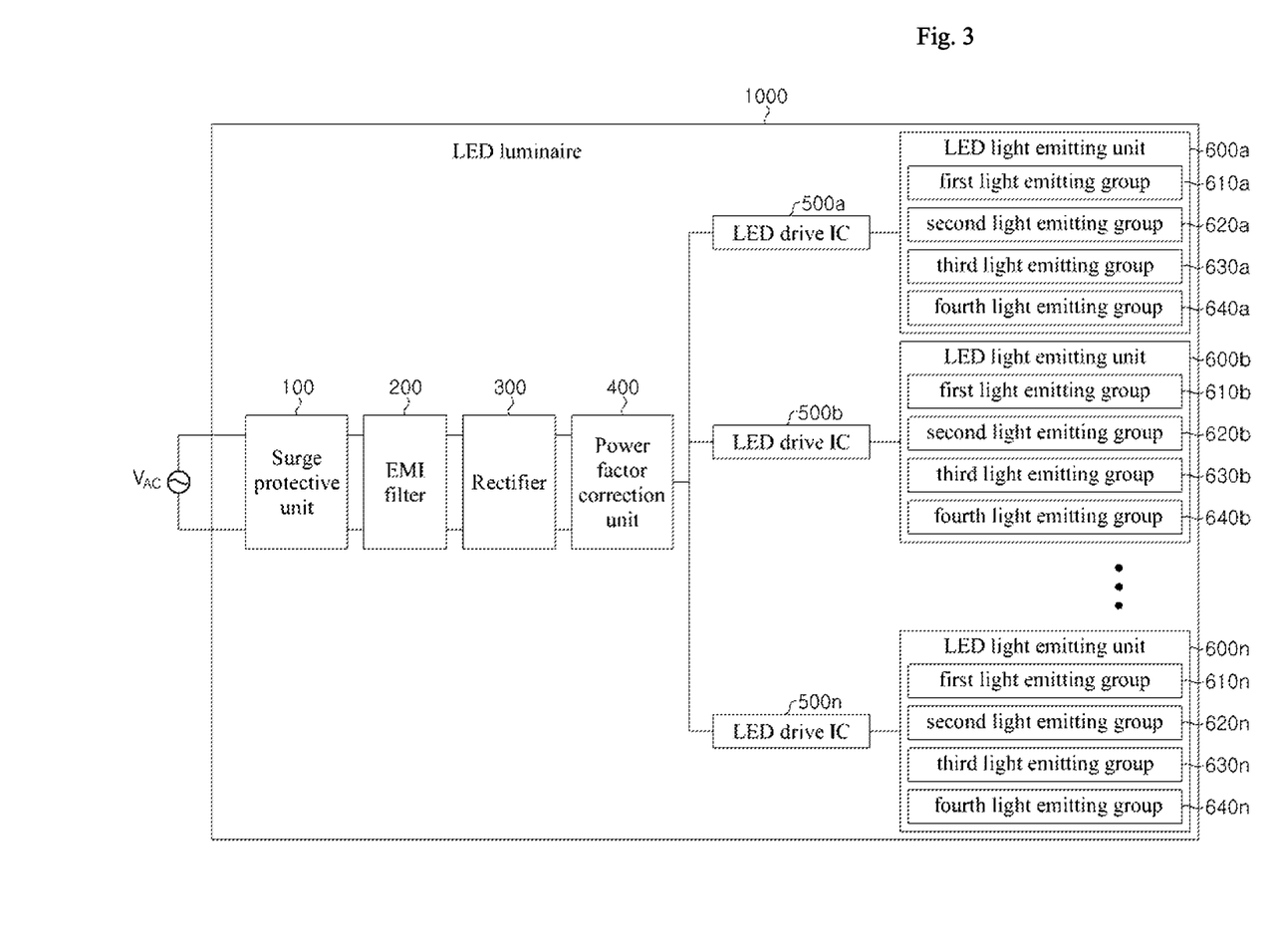
FIG. 3 is a block diagram of an LED luminaire having a high power LED drive circuit in accordance with one embodiment of the present invention.

FIG. 3 is a block diagram of an LED luminaire having a high power LED drive circuit (hereinafter, the "LED luminaire") in accordance with one embodiment of the invention. Now, referring to FIG. 3, the constitution and functions of the LED luminaire 1000 according to this embodiment will be described in more detail.

Referring to FIG. 3, the LED luminaire 1000 according to this embodiment includes a surge protection unit 100, an EMI filter 200, a rectifier 300, a power factor correction unit 400, an LED drive IC 500, and an LED light emitting unit 600.

The surge protection unit 100 may be constituted by at least one varistor and serves to protect the LED luminaire 1000 from surge voltage and inrush current. In addition, the EMI filter 200 serves to remove RF noise from AC voltage $V_{AC}$. The surge protection unit 100 and the EMI filter 200 are well known in the art, and detailed descriptions thereof will be omitted herein.

The rectifier 300 receives and rectifies AC voltage $V_{AC}$ output from an AC power source inside or outside the LED luminaire 1000 to generate rectified voltage Vrec, and flattens the rectified voltage Vrec to generate and output a first rectified voltage $V_{rec1}$ having a predetermined value.

The power factor correction unit 400 receives the first rectified voltage output from the rectifier 300, and generates and outputs a pulsating drive voltage $V_D$ greater than or equal to the first threshold voltage $V_{TH1}$ by stepping up or stepping down the first rectified voltage $V_{rec1}$. Compared with a DC-DC converter type power factor correction unit generally used in the art, the power factor correction unit 400 according to this embodiment has a main feature of generating and outputting a ripple voltage matching characteristics of the LED drive IC 500 as the drive voltage $V_D$ instead of outputting DC voltage having a fixed voltage level as the drive voltage. As described above, the LED drive IC 500 determines the voltage level of the received drive voltage (for example, rectified voltage Vrec), and selectively turns on and turns off a plurality of light emitting groups according to the determined voltage level of the drive voltage. Thus, a typical power factor correction unit, which outputs a DC voltage having a fixed voltage level as the drive voltage, is not suitable for the characteristics of the LED drive IC 500 described above and, in this case, does not need the LED drive IC 500 since sequential drive control is not needed. In addition, such a typical power factor correction unit includes a large capacitance flattening capacitor at an output terminal to output a drive voltage having a fixed voltage level. Such a flattening capacitor is generally realized by a large size and expensive capacitor, thereby increasing the size and manufacturing costs of the power factor correction unit. In order to solve such problems, the power factor correction unit 400 according to this embodiment is configured to generate and output a pulsating ripple voltage greater than or equal to the first threshold voltage $V_{TH1}$ as the drive voltage $V_D$. Accordingly, the drive voltage $V_D$ output from the power factor correction unit 400 according to this embodiment is not only suited to the characteristics of the LED drive IC 500, but also may achieve reduction in size and manufacturing costs of the power factor correction unit 400 by eliminating the flattening capacitor, which is generally provided to the output terminal thereof, or by adopting a film type capacitor having a small capacitance.

Figure 4A:
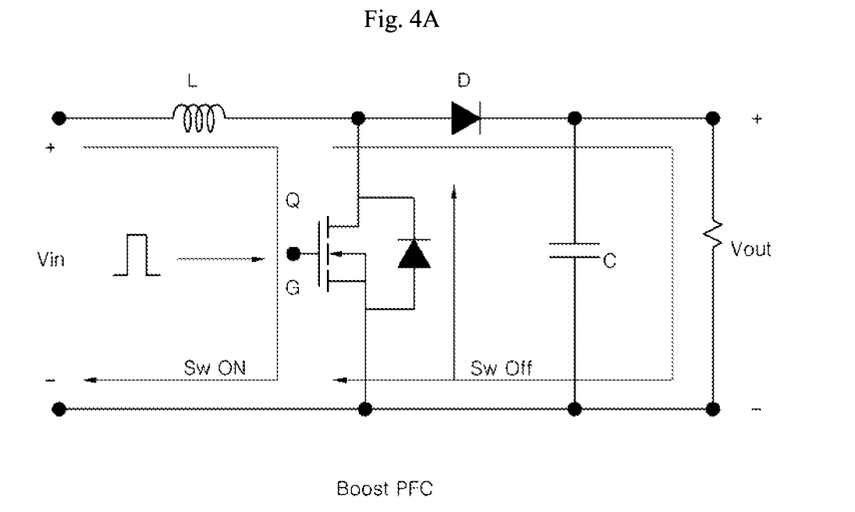
FIG. 4a is a block diagram of a boost converter which may be provided to a power factor correction unit in accordance with one embodiment of the present invention.
Figure 4B:
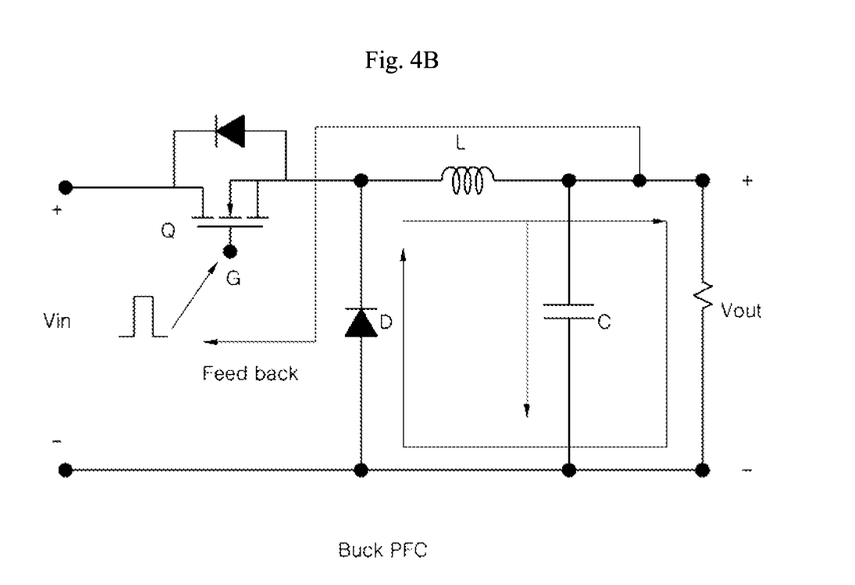
FIG. 4b is a block diagram of a buck converter which may be provided to a power factor correction unit in accordance with another embodiment of the present invention.
Figure 4C:
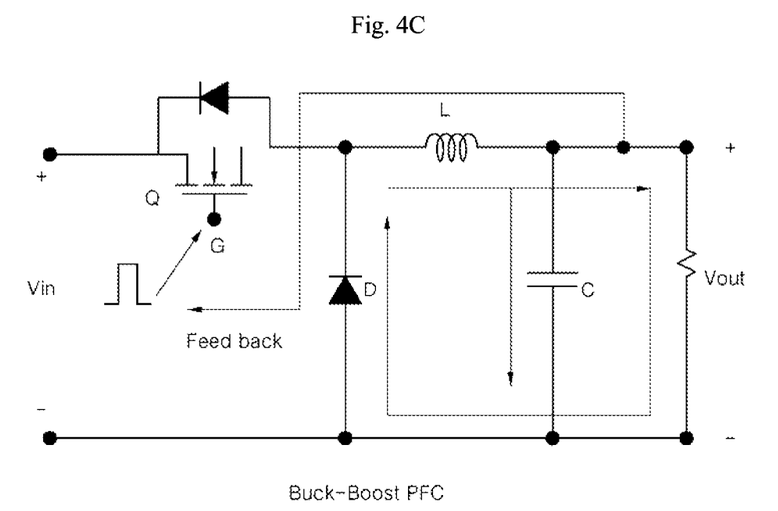
FIG. 4c is a block diagram of a buck-boost converter which may be provided to a power factor correction unit in accordance with a further embodiment of the present invention.

FIGS. 4a to 4c illustrate various converters which may be provided to a power factor correction unit according to one embodiment of the invention. It should be understood that the present invention is not limited thereto, and any converter circuit capable of performing the aforementioned functions may be provided to the power factor correction unit 400 according to the present invention.

FIG. 4a is a block diagram of a boost converter which may be provided to a power factor correction unit according to one embodiment of the invention. As shown in FIG. 4a, the power factor correction unit 400 according to this embodiment may include a boost converter. When the power factor correction unit 400 includes the boost converter, the power factor correction unit 400 may generate drive voltage $V_D$ by stepping up AC voltage $V_{AC}$. For example, the power factor correction unit 400 including the boost converter according to this embodiment may receive an AC voltage of 120V and output a drive voltage $V_D$ pulsating between a minimum value of the first threshold voltage $V_{TH1}$ and a maximum value of 260 V. However, it should be noted that the drive voltage $V_D$ is not limited thereto. That is, it will be apparent to those skilled in the art that the drive voltage $V_D$ may vary depending on the number of light emitting groups in the LED light emitting unit 600, threshold voltage, and the like. As shown in FIG. 4a, such a boost converter has similar functions to a typical boost converter in that both booster converters store energy in an inductor L by turning on a switching device Q and steps up the first rectified voltage $V_{rec1}$ using counter electromotive force generated by the inductor (L) by turning off the switching device Q. However, as described above, since the boost converter according to this embodiment is configured to generate a pulsating voltage as the drive voltage, the boost converter may eliminate a reverse current preventing diode D and a flattening capacitor C in FIG. 4a. Alternatively, the boost converter may include the reverse current preventing diode D and the flattening capacitor C. In this case, since the flattening capacitor C is realized by a film capacitor as described above, the boost converter according to this embodiment is distinguished from the typical boost converter in that a pulsating voltage is generated and output as the drive voltage.

FIG. 4b is a block diagram of a buck converter which may be provided to a power factor correction unit in accordance with another embodiment of the present invention. Like the boost converter described with reference to FIG. 4a, stepping down of the buck converter according to this embodiment is similar to that of a typical buck converter in the art. Here, as described above, since the buck converter according to this embodiment is configured to generate a pulsating voltage as the drive voltage, the buck converter may eliminate the reverse current preventing diode D and the flattening capacitor C in FIG. 4b. Alternatively, the buck converter may employ a film capacitor as the flattening capacitor C and may include the reverse current preventing diode D. With this configuration, the buck converter according to this embodiment may generate and output a drive voltage pulsating between a minimum value of the first threshold voltage $V_{TH1}$ and a maximum value of 130V upon receiving, for example, an AC voltage of 220V.

FIG. 4c is a block diagram of a buck-boost converter which may be provided to a power factor correction unit in accordance with a further embodiment of the present invention. Like the boost converter described with reference to FIG. 4a and the buck converter described with reference to FIG. 4b, stepping down and stepping up of the buck-boost converter according to this embodiment is similar to those of a typical buck-boost converter in the art. Here, as described above, since the buck-boost converter according to this embodiment is configured to generate a pulsating voltage as the drive voltage, the buck-boost converter may eliminate the reverse current preventing diode D and the flattening capacitor C in FIG. 4b. Alternatively, the buck-boost converter may employ a film capacitor as the flattening capacitor C and may include the reverse current preventing diode D. With this configuration, the buck-boost converter according to this embodiment may generate and output a drive voltage pulsating between a minimum value of the first threshold voltage $V_{TH1}$ and a maximum value of 260V upon receiving, for example, an AC voltage of 90V to 220V.

According to the present embodiment, the LED light emitting unit 600 emits light upon receiving the drive voltage $V_D$ supplied from the power factor correction unit 400. More specifically, the LED light emitting unit 600 according to this embodiment includes m light emitting groups, each of which includes at least one LED. In the embodiment of FIG. 3, the LED light emitting unit 600 is illustrated as including first to fourth light emitting groups 610 to 640 for convenience of description and understanding. However, it will be apparent to those skilled in the art that the present invention is not limited thereto, and that various modification and changes can be made without departing from the scope of the invention.

According to the present embodiment, the LED drive IC 500 determines the voltage level of the drive voltage $V_D$ input from the power factor correction unit 400, and sequentially drives the first light emitting group 610, the second light emitting group 620, the third light emitting group 630 and the fourth light emitting group 640 according to the voltage level of the drive voltage $V_D$. Although not shown in FIG. 3, the LED drive IC 500 may include a first switch (not shown) for controlling driving of the first light emitting group 610, a second switch (not shown) for controlling driving of the second light emitting group 620, a third switch (not shown) for controlling driving of the third light emitting group 630, and a fourth switch (not shown) for controlling driving of the fourth light emitting group 640, as in the LED drive IC shown in FIG. 1. The first to fourth switches may be realized using at least one of a metal-oxide semiconductor field-effect transistor (MOSFET), insulation gate bipolar transistor (IGBT), bipolar junction transistor (BJT), junction field effect transistor (JFET), thyristor (silicon controlled rectifier), and triac, all of which can be turned on or turned off in response to a switch control signal input from the LED drive IC 500. In addition, the first switch, the second switch, the third switch and the fourth switch may be configured to control electric current, which flows therethrough according to control of the LED drive IC 500, to a preset constant current.

Referring to FIG. 3, the LED luminaire 1000 according to this embodiment includes first to n-th LED light emitting units 600a~600n, and may include first to n-th LED drive ICs 500a to 500n for controlling sequential driving of the first to n-th LED light emitting units 600a~600n, respectively. Here, n is a positive integer of 2 or more, and may be set in various ways, as needed. In this way, each of the LED light emitting units 600a~600n is provided with the corresponding LED drive IC (one of 500a to 500n) for controlling sequential driving of the corresponding LED light emitting unit, thereby enabling precise control of drive current for the respective LED light emitting units to a constant current. Further, it is anticipated that the LED luminaire 1000 can be stably operated even in the event where one of the plural LED drive ICs 500a to 500n breaks down.

Figure 5:
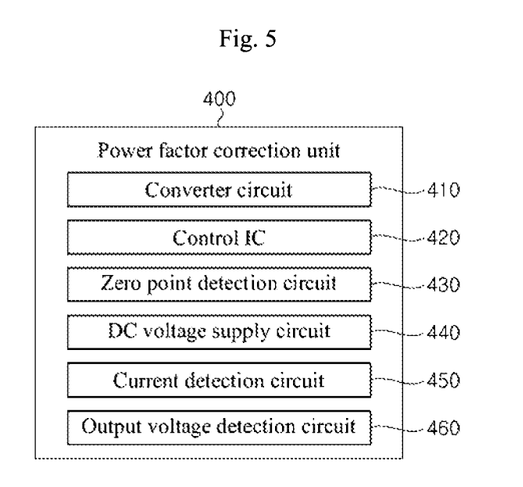
FIG. 5 is a block diagram of a power factor correction unit in accordance with one embodiment of the present invention.
Figure 6:
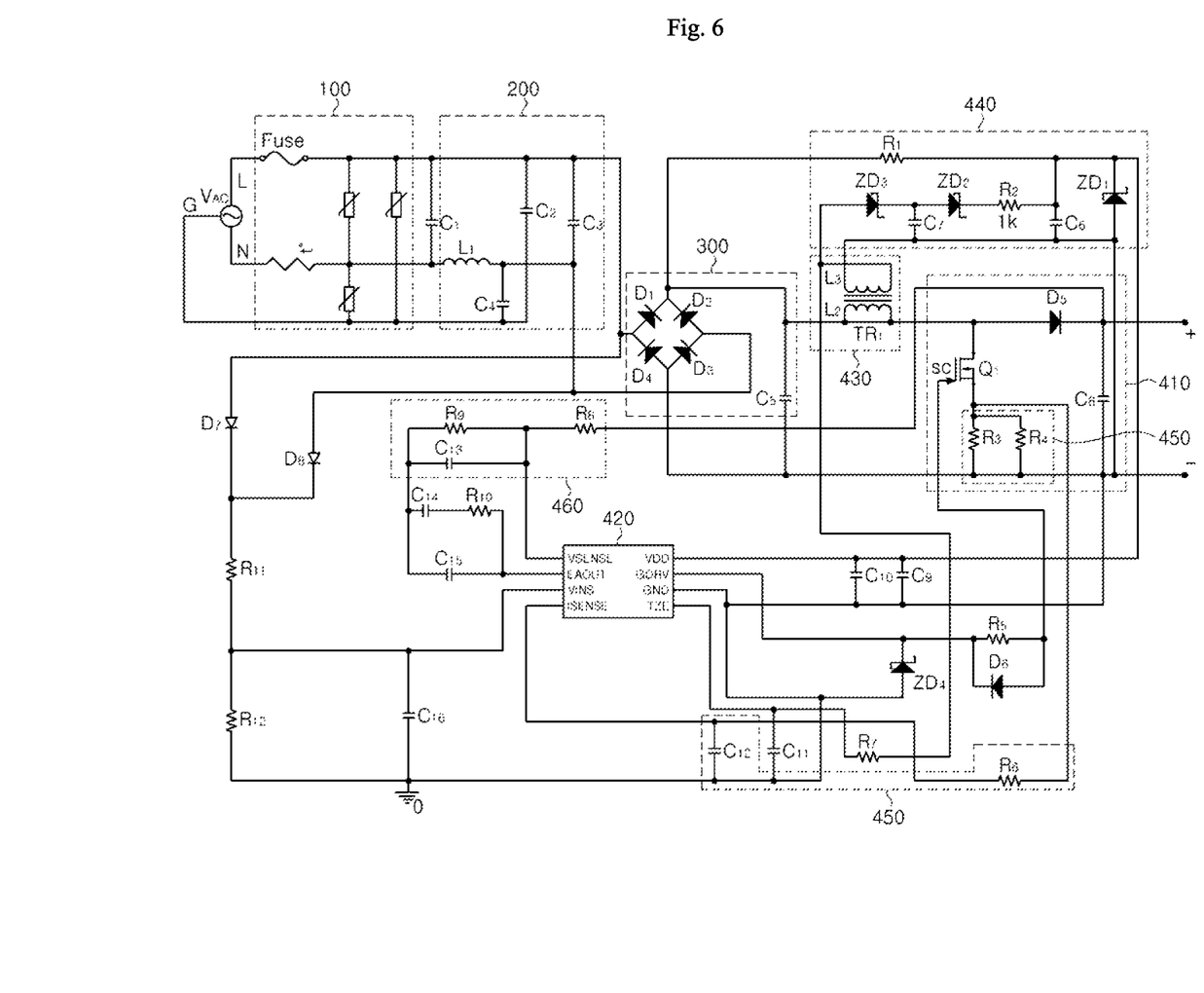
FIG. 6 is a circuit diagram of a power factor correction unit in accordance with one embodiment of the present invention.

FIG. 5 is a block diagram of a power factor correction unit in accordance with one embodiment of the present invention, and FIG. 6 is a circuit diagram of the power factor correction unit in accordance with the embodiment of the present invention. Now, referring to FIG. 5 and FIG. 6, the constitution and functions of the power factor correction unit 400 according to the embodiment will be described in more detail.

Referring to FIGS. 5 and 6, the power factor correction unit 400 according to this embodiment is realized using the boost converter described in FIG. 4a. However, as described above, the present invention is not limited thereto, and any circuit may be adopted as the power factor correction unit 400 so long as the circuit satisfies the spirit of the present invention, that is, the circuit can output a pulsating ripple voltage equal to or greater than the first threshold voltage $V_{TH1}$. As such, it will be apparent to those skilled in the art that such various modification and changes can be made in this way without departing from the scope of the present invention.

First, the rectifier 300 according to this embodiment receives the AC voltage $V_{AC}$ and outputs the first rectified voltage $V_{rec1}$ to the power factor correction unit 400. To this end, the rectifier 300 may include a full-wave rectification circuit, which is constituted by four diodes, that is, D1, D2, D3 and D4, to output the rectified voltage Vrec through full-wave rectification of the AC voltage, and a flattening capacitor C5, which flattens the rectified voltage Vrec output from the full-wave rectification circuit and outputs the first rectified voltage $V_{rec1}$. According to capacitance of the flattening capacitor C5, the first rectified voltage $V_{rec1}$ may be a ripple voltage similar to a DC voltage having a substantially fixed voltage value, or may be a ripple voltage pulsating at a constant frequency.

As described above, the power factor correction unit 400 according to this embodiment generates the pulsating drive voltage $V_D$, which is greater than or equal to the first threshold voltage $V_{TH1}$, by stepping up or stepping down the first rectified voltage $V_{rec1}$ output from the rectifier 300, and outputs the generated drive voltage $V_D$ to the LED drive IC 500 and the LED light emitting unit 600. To this end, the power factor correction unit 400 includes a converter circuit 410, a control IC 420, a zero point detection circuit 430, a DC voltage supply circuit 440, a current detection circuit 450, and an output voltage detection circuit 460, as shown in FIG. 5.

As described above, the converter circuit 410 may be any one selected from among various converter circuits having various technical features of the present invention, as needed. FIG. 6 illustrates one embodiment wherein a boost converter circuit 410 is adopted as the converter circuit 410 and is configured to generate and output the pulsating drive voltage $V_D$ which is greater than or equal to the first threshold voltage $V_{TH1}$ by stepping up the first rectified voltage $V_{rec1}$. Referring to FIG. 6, the boost converter circuit 410 according to this embodiment includes a first inductor L2 and a first switching device Q1.

The first inductor L2 is connected to the rectifier 300 to receive the first rectified voltage $V_{rec1}$ input from the rectifier 300, stores energy while the first switching device Q1 is turned on, and generates counter electromotive force to step up the first rectified voltage $V_{rec1}$ while the first switching device is turned off. Specifically, while the first switching device Q1 is turned on, a current path is formed between the first inductor L2, the first switching device Q1 and the ground, so that energy is stored in the first inductor L2. While the first switching device Q1 is turned on, voltage between both ends of the first inductor L2 does not change, so that the counter electromotive force is not generated due to no change of magnetic flux. Then, when the first switching device Q1 is turned off, a magnetic field around the first inductor L2 is removed, so that the counter electromagnetic force is generated between both ends of the first inductor L2, thereby inducing reverse voltage. Thus, the first rectified voltage $V_{rec1}$ is stepped up by the induced reverse voltage and is then output as the drive voltage $V_D$. At this time, the induced reverse voltage depends on the intensity of energy stored in the first inductor L2, and thus depends on a period of time for which the first switching device Q1 is turned on.

In some embodiments, the first inductor L2 may be realized by a primary coil of a first transformer TR1. Specifically, when the control IC 420 is configured to turn on the first switching device Q1 at a time point that current flowing through the first inductor L2 reaches 0 (that is, at a time point that energy stored in the first inductor L2 reaches 0), the power factor correction unit 400 according to this embodiment may include a zero point detection circuit 430 to detect an electric current of 0. In this case, a primary coil of the zero point detection circuit 430 functions as the first inductor L2, and a secondary coil L3 of the zero point detection circuit 430 functions to detect electric current flowing through the first inductor L2 and output the current to the control IC 420.

The first switching device Q1 is connected in parallel to the first inductor L2 and is turned on/off in response to a switching control signal SC input from the control IC 420. In the embodiment shown in FIG. 6, an enhancement type N-channel MOSFET is illustrated as the first switching device Q1. However, it should be understood that the present invention is not limited thereto. That is, any one of an insulation gate bipolar transistor (IGBT), bipolar junction transistor (BJT), junction field effect transistor (JFET), thyristor (silicon controlled rectifier), and triac, all of which have a switching function, may be selected as the first switching device, as needed.

The power factor correction unit 400 according to the present invention further includes a first diode D5 and a first capacitor C8. As described above, when the power factor correction unit 400 generates and outputs the drive voltage $V_D$, a pulsating ripple voltage equal to or greater than the first threshold voltage $V_{TH1}$ is output as the drive voltage $V_D$ instead of a DC voltage having a fixed voltage level. Thus, the first capacitor C8 may be eliminated from the power factor correction unit 400, or a film capacitor having lower capacitance than an electrolytic capacitor may be used as the first capacitor therein. The first capacitor C8 is connected in parallel between the first switching device Q1 and an output terminal of the boost converter circuit, and functions to flatten the drive voltage $V_D$. More specifically, the first capacitor is charged by the first rectified voltage $V_{rec1}$ when the first switching device Q1 is turned on, and is discharged and supplies the drive voltage $V_D$ to flatten the drive voltage $V_D$ when the first switching device Q1 is turned off. Only when the first capacitor C8 is provided to the power factor correction unit 400, the first diode D5 is provided to the power factor correction unit 400 and connected between the first capacitor C8 and the first inductor L2 to block reverse current flowing from the first capacitor C8 to the first inductor L2.

In the above description, the constitution and functions of the boost converter circuit 410 have been described with reference to FIG. 6. However, it should be noted that the aforementioned embodiment of the boost converter circuit 410 is provided for illustration only and various converter circuits may be used without departing from the scope of the invention.

The DC voltage supply circuit 440 is connected to the rectifier 300 to receive the first rectified voltage, and generates and outputs DC voltage $V_{DD}$ for stabilizing a control IC by stabilizing the first rectified voltage. The DC voltage $V_{DD}$ output from the DC voltage supply circuit 440 is applied to a VDD terminal of the control IC 420. The DC voltage supply circuit 440 is well known in the art, and thus a detailed description thereof will be omitted.

The control IC 420 generates a switching control signal SC for controlling turn on/turn off of the first switching device Q1 within the boost converter circuit 410, and outputs the generated switching control signal SC to the first switching device Q1. In some embodiments, the control IC 420 may generate the switching control signal SC through any one of various manners in order to obtain a desired drive voltage $V_D$.

In one embodiment, the control IC 420 may output a pulse width modulation (PWM) signal having a fixed duty cycle and a fixed duty ratio as the switching control signal SC. In this case, the duty cycle and the duty ratio may be empirically and/or theoretically determined according to desired drive voltage $V_D$. In this case, there is no need for detection of separate information for controlling turn on/turn off of the first switching device Q1, and thus, the zero point detection circuit 430 and the current detection circuit 450 may be eliminated from the power factor correction unit 400 shown in FIG. 6.

In another embodiment, the control IC 420 may be connected to the zero point detection circuit 430 and the output voltage detection circuit 460. In this embodiment, the control IC 420 may dynamically control turn on/turn off of the first switching device Q1 in response to a signal input from each circuit. To this end, as shown in FIG. 6, the control IC 420 according to this embodiment may include a TZE terminal connected to the zero point detection circuit 430 to receive a transformer zero energy detection signal input from the zero point detection circuit 430, and a VSENSE terminal connected to the output voltage detection circuit 460 to receive an output voltage detection signal input from the output voltage detection circuit 460. As described above, the zero point detection circuit 430 detects electric current flowing through the first inductor L2 and outputs the detected current value to the control IC 420. Thus, the control IC 420 may monitor an input value from the zero point detection circuit 430 and may generate a switching control signal SC for turning on the first switching device Q1 to output this signal to the first switching device Q1 when the input value is 0, that is, when no current flows through the first inductor L2. More specifically, the control IC 420 according to this embodiment may generate a switching control signal SC for turning on the first switching device Q1 to output this signal to the first switching device Q1, when a signal is not input from the zero point detection circuit 430 for a time of 400 μs, that is, where zero energy is not detected for 400 μs. On the other hand, the output voltage detection circuit 460 is connected to an output terminal of the power factor correction unit 400, detects the output drive voltage $V_D$, and outputs the detected voltage value to the control IC 420. The control IC 420 monitors the value of the drive voltage input from the output voltage detection circuit 460, and generates a switching control signal SC for turning off the first switching device Q1 to output this signal to the first switching device Q1 when the output drive voltage $V_D$ is lowered to a preset critical value or less. Through the aforementioned procedures, the control IC 420 dynamically controls turn on/turn off of the first switching device Q1.

The control IC 420 detects the drive voltage $V_D$ input from the output voltage detection circuit 460 and protects the LED drive IC 500 from surge voltage by stopping switching operation of the first switching device Q1 when it is determined that the drive voltage $V_D$ is greater than or equal to a preset value. More specifically, when the detected drive voltage $V_D$ is greater than or equal to a preset value, that is, when surge voltage is detected, the control IC 420 turns off the first switching device Q1, so that the duty ratio is decreased, thereby lowering the voltage value. Accordingly, the control IC 420 may provide an overvoltage protection function.

In some embodiments, the control IC 420 may further include an ISENSE terminal, through which the control IC 420 is connected to the current detection circuit 450 and receives a current value input from the current detection circuit 450. The current detection circuit 450 detects electric current flowing through the first switching device Q1 and outputs the detected current value to the control IC 420. Thus, the control IC 420 may monitor the current value input from the current detection circuit 450, and protect the first switching device Q1 from overvoltage by stopping switching operation of the first switching device Q1 when it is determined that the detected current value exceeds a preset value. More specifically, when overvoltage exceeding a preset value is detected, the control IC 420 turns off the first switching device Q1, so that the duty ratio is decreased, thereby lowering the current value.

Figure 7:
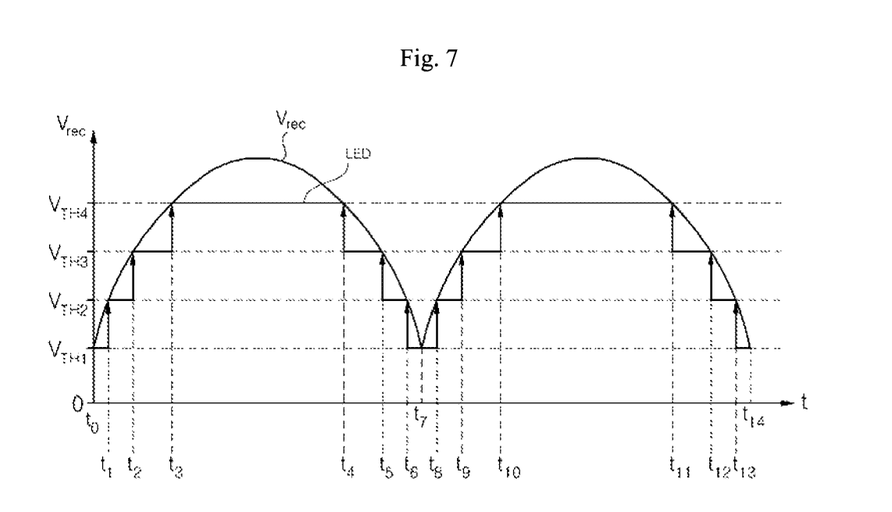
FIG. 7 is a waveform diagram of output voltage of the power factor correction unit in accordance with the embodiment of the present invention.

FIG. 7 is a waveform diagram of output voltage of the power factor correction unit in accordance with the embodiment of the invention. As shown in FIG. 7, the drive voltage $V_D$ output from the power factor correction unit 400 is a pulsating ripple voltage equal to or greater than the first threshold voltage $V_{TH1}$. Now, operation of driving the LED luminaire 1000 in one cycle of the drive voltage $V_D$ will be described in more detail with reference to FIG. 7.

As described above, since the drive voltage $V_D$ has a minimum value greater than or equal to the first threshold voltage $V_{TH1}$, the LED drive IC 500 allows only the first light emitting group 610 to emit light at an initial time point (t0) of the cycle.

Then, when the voltage level of the drive voltage $V_D$ increases and reaches a second threshold voltage $V_{TH2}$ (time point t1), the LED drive IC 500 allows the first light emitting group 610 and the second light emitting group 620 to emit light.

Then, when the voltage level of the drive voltage $V_D$ further increases and reaches a third threshold voltage $V_{TH3}$ (time point t2), the LED drive IC 500 allows the first to third light emitting groups 610 to 630 to emit light.

In addition, when the voltage level of the drive voltage $V_D$ further increases and reaches a fourth threshold voltage $V_{TH4}$ (time point t3), the LED drive IC 500 allows all of the first to fourth light emitting groups 610 to 640 to emit light.

On the other hand, when the voltage level of the drive voltage $V_D$ decrease below the fourth threshold voltage $V_{TH4}$ (time point t4) after reaching the highest level, the LED drive IC 500 turns off the fourth light emitting group 640 and allows the first to third light emitting groups 610 to 630 to emit light.

Then, when the voltage level of the drive voltage $V_D$ continues to decrease below the third threshold voltage $V_{TH3}$ (time point t5), the LED drive IC 500 turns off the third light emitting group 630 and allows only the first and second light emitting groups 610, 620 to emit light.

Further, when the voltage level of the drive voltage $V_D$ decreases below the second threshold voltage $V_{TH1}$ (time point t6), the LED drive IC 500 turns off the second light emitting group 620 and allows only the first light emitting group 610 to emit light.

On the other hand, even when the voltage level of the drive voltage $V_D$ is lowered below a minimum value (time point t7), the voltage level of the drive voltage $V_D$ is still greater than or equal to the first threshold voltage $V_{TH1}$, and thus the first light emitting group 610 continues to emit light.

As described above, the LED luminaire 1000 according to this embodiment employs the power factor correction unit 400 which provides the drive voltage $V_D$, a minimum value of which is the first threshold voltage $V_{TH1}$ or more, thereby eliminating flickering.

Although the present invention has been described with reference to some embodiments and accompanying drawings, it will be understood by those skilled in the art that these embodiments are provided for illustration only, and various modifications, changes, alterations and equivalent embodiments can be made without departing from the scope of the present invention.

Therefore, the scope and sprit of the present invention are not limited to the embodiments and should be defined only by the accompanying claims and equivalents thereof.

What is claimed is:

1. A light emitting diode (LED) luminaire, comprising:
a rectifier configured to output a first rectified voltage generated by rectifying and then flattening an AC voltage;
a power factor correction unit configured to generate and output a drive voltage equal to or greater than a first threshold voltage sufficient to drive a first light emitting group by stepping up or stepping down the first rectified voltage;
light emitting groups that each comprise at least one LED, the light emitting groups being sequentially driven by receiving the drive voltage input from the power factor correction unit; and
an LED drive integrated circuit (IC) configured to determine a voltage level of the drive voltage and to control the sequential driving of the light emitting groups according to the determined voltage level of the drive voltage.

2. The LED luminaire according to claim 1, wherein the power factor correction unit generates the drive voltage by stepping up and stabilizing the AC voltage.

3. The LED luminaire according to claim 2, wherein the power factor correction unit comprises a boost converter or a buck-boost converter.

4. The LED luminaire according to claim 3, wherein the power factor correction unit comprises:
a DC voltage supply circuit configured to stabilize the first rectified voltage to generate a DC power supplied to a control integrated circuit (IC); and
a boost converter circuit configured to step up the first rectified voltage in response to a switching control signal from the control IC to generate and output the drive voltage,
wherein the control IC generates and outputs the switching control signal to the boost converter circuit.

5. The LED luminaire according to claim 4, wherein the boost converter circuit further comprises:
a first inductor to receive the first rectified voltage input from the rectifier, to accumulate energy while a first switching device is turned on, and to generate counter electromotive force while the first switching device is turned off; and
the first switching device connected in parallel to the first inductor to be turned on and off in response to the switching control signal from the control IC,
wherein the power factor correction unit further comprises:
a zero point detection circuit configured to detect the energy stored in the first inductor; and
an output voltage detection circuit connected to an output terminal of the boost converter circuit and configured to detect the drive voltage output from the boost converter circuit,
wherein the control IC is connected to the zero point detection circuit and the current detection circuit, and is configured to generate the switching control signal to turn on the first switching device when the energy stored in the first inductor reaches zero and to turn off the first switching device when the drive voltage becomes a preset critical value or less.

6. The LED luminaire according to claim 5, wherein the boost converter circuit further comprises:
a first capacitor connected in parallel between the first switching device and the output terminal of the boost converter circuit, and configured to flatten the drive voltage; and
a first diode connected between the first capacitor and the first inductor, and configured to block reverse current flowing from the first capacitor to the first inductor.

7. The LED luminaire according to claim 5, wherein the power factor correction unit further comprises a current detection circuit connected between the first switching device and ground, and configured to detect electric current flowing through the first switching device,
wherein the control IC stops the switching of the first switching device when the electric current input from the current detection circuit is greater than a preset overcurrent reference value.

8. The LED luminaire according to claim 5, wherein control IC stops the switching of the first switching device when the drive voltage input from the output voltage detection circuit is greater than a preset overvoltage reference value.

9. The LED luminaire according to claim 1, wherein the power factor correction unit generates the drive voltage by stepping down and stabilizing the AC voltage.

10. The LED luminaire according to claim 9, wherein the power factor correction unit comprises a buck converter or a buck-boost converter.

* * * * *